US010704604B2

(12) United States Patent
Kerr

(10) Patent No.: US 10,704,604 B2
(45) Date of Patent: Jul. 7, 2020

(54) ONE-TO-ONE TORQUE COUPLING

(71) Applicant: KER-TRAIN HOLDINGS LTD., Kingston (CA)

(72) Inventor: John Hugh Kerr, Kingston (CA)

(73) Assignee: KER-TRAIN HOLDINGS LTD., Kingston, ON (CA)

( * ) Notice: Subject to any disclaimer, the term of this patent is extended or adjusted under 35 U.S.C. 154(b) by 432 days.

(21) Appl. No.: 15/501,726

(22) PCT Filed: Aug. 5, 2015

(86) PCT No.: PCT/CA2015/050735
§ 371 (c)(1),
(2) Date: May 17, 2017

(87) PCT Pub. No.: WO2016/019462
PCT Pub. Date: Feb. 11, 2016

(65) Prior Publication Data
US 2017/0276180 A1    Sep. 28, 2017

Related U.S. Application Data

(60) Provisional application No. 62/033,554, filed on Aug. 5, 2014.

(51) Int. Cl.
*F16D 3/04* (2006.01)
(52) U.S. Cl.
CPC ............. *F16D 3/04* (2013.01); *Y10S 384/903* (2013.01)
(58) Field of Classification Search
CPC ................................. F16D 3/04; Y10S 384/903
(Continued)

(56) References Cited

U.S. PATENT DOCUMENTS 916,914 A * 3/1909 Cooley .................. 464/103
1,159,777 A 11/1915 Kerr
(Continued)

FOREIGN PATENT DOCUMENTS

DE    202011002172 U1    5/2012
JP    2001173671 A       6/2001
(Continued)

OTHER PUBLICATIONS

Canadian Intellectual Property Office, ISR/WO issued on PCT/CA2015/050735, dated Oct. 30, 2015, 7 pgs.
(Continued)

*Primary Examiner* — Greg Binda
(74) *Attorney, Agent, or Firm* — Greenberg Traurig, LLP

(57) ABSTRACT

A one-to-one torque coupling includes a centre member, left and right side members, and a plurality of torque transfer elements. The centre member is disposed between the side members, has a main axis of rotation and includes a plurality of holes disposed about the main axis at a radius. The side members each have a common secondary axis of rotation that is parallel to and offset from the main axis. Each side member also includes a plurality of holes that are congruent with the holes in the centre member and are disposed about the secondary axis at the radius. The torque transfer elements extend through the holes of the centre member into the holes of the side members, and rotate about a third axis that is parallel to and disposed midway between the main axis and the secondary axis. The torque transfer elements transfer torque between the centre member and the side members through rolling contact between the torque transfer elements and the holes of the centre and side members.

3 Claims, 13 Drawing Sheets

(58) Field of Classification Search
USPC .......................................... 464/103; 384/215
See application file for complete search history.

(56) References Cited

U.S. PATENT DOCUMENTS

| | | | |
|---|---|---|---|
| 1,933,072 A * | 10/1933 | Ricefield | ................... F16D 3/70 |
| | | | 464/103 |
| 2,491,364 A | 12/1949 | Earl | |
| 3,592,517 A * | 7/1971 | Harris | ..................... F16C 27/02 |
| | | | 384/215 |
| 6,126,566 A | 10/2000 | Kerr | |
| 6,669,594 B2 | 12/2003 | Kerr | |
| 8,764,597 B2 | 7/2014 | Kerr | |
| 2009/0297255 A1 | 12/2009 | Head | |

FOREIGN PATENT DOCUMENTS

| | | | |
|---|---|---|---|
| JP | 2008 240961 A | 10/2008 | |
| SU | 881409 * | 11/1981 | ................... 464/103 |
| WO | 2008114788 A1 | 9/2008 | |
| WO | 2009083023 A1 | 7/2009 | |
| WO | 2014061330 A1 | 4/2014 | |

OTHER PUBLICATIONS

European Patent Office, Supplementary European Search Report issued on EP15829637.6, date of completion, Mar. 29, 2018, 5 pgs.

\* cited by examiner (*From* "Kinematics"
by R. J. Durley)

Fixed main axis, c1
Rotating eccentric axis, c2

ONE-TO-ONE TORQUE COUPLING

RELATED APPLICATIONS

This patent application claims the benefit of and is a National Stage Application under 35 C.F.R. § 371 of International Application No. PCT/CA2015/050735, filed Aug. 5, 2015, and titled "One-to-One Torque Coupling," which claims the benefit of the filing date of U.S. Patent Application No. 62/033,554, entitled "One-to-One Torque Coupling", filed Aug. 5, 2014, the contents of each of which are hereby incorporated herein by reference in their entireties.

FIELD

This patent application relates to couplings and methods for transmitting power between two rotating components, more particularly, for couplings to transmit power between two components rotating on parallel axes at a pre-defined radial distance apart without changing the speed or direction of rotation.

BACKGROUND

Devices for transferring power from one axis to a second parallel offset axis are well known in the art. Typically this transfer occurs with the use of gears, chains, sprockets and belts where there is some predefined change in speed and torque. If it is desired that there be no speed difference between the two shafts, prior art typically requires large and complex components to continuously transfer the power. This becomes of particular concern when the distance between the two rotating shafts is relatively small.

SUMMARY

By way of overview, this disclosure relates to a torque coupling that allows for the transfer of torque from a first torque member to a second torque member without a change in rotational speed between the torque members.

In one aspect, the torque coupling includes a centre member, left and right side members, and a plurality of torque transfer elements. The centre member is disposed between the side members, has a main axis of rotation and includes a plurality of holes that are disposed about the main axis at a radius. The side members each have a common secondary axis of rotation that is parallel to and offset from the main axis. Each side member includes a plurality of holes that are congruent with the holes in the centre member and are disposed about the secondary axis at the radius.

The torque transfer elements extend through the holes of the centre member into the holes of the side members. The torque transfer elements rotate about a third axis that is parallel to and disposed midway between the main axis and the secondary axis and transfer torque between the centre member and the side members through rolling contact between the torque transfer elements and the holes of the centre and side members. As a result, torque is transferred between the main axis and the secondary axis without a change in rotational speed or direction between the centre member and the side members.

In one implementation, the holes of the centre member are equally spaced about the main axis, and the holes of the side members are equally spaced about the secondary axis. The diameter of the torque transfer elements may be greater than the distance between the main axis and the secondary axis.

The torque transfer elements may comprise cylindrical rollers. Each cylindrical roller may have a diameter that is mutually independent of the distance between the main axis and the secondary axis. Alternately, the torque transfer elements may comprise elliptical rollers, or spherical rollers.

In another aspect, the torque coupling includes a centre member, left and right side members, first and second torque members, and a plurality of torque transfer elements.

The centre member is disposed between the side members, has a main axis of rotation and includes a plurality of holes that are disposed about the main axis at a radius. The side members each have a common secondary axis of rotation that is parallel to and offset from the main axis. Each side member includes a plurality of holes that are disposed about the secondary axis at the radius. The first torque member is coupled to the centre member, and the second torque member is coupled to at least one of the side members.

The torque transfer elements extend through the holes of the centre member into the holes of the side members. The torque transfer elements rotate about a third axis that is parallel to and disposed midway between the main axis and the secondary axis and transfer torque between the first torque member and the second torque member through rolling contact between the torque transfer elements and the holes of the centre and side members. As a result, torque is transferred between the main axis and the secondary axis without a change in rotational speed or direction between the first torque member and the second torque member.

In one implementation, the first torque member has a fixed axis of rotation that coincides with the main axis, and the second torque member has a fixed axis of rotation that coincides with the secondary axis. In another implementation, the second torque member has an axis of rotation that orbits eccentrically about the fixed axis of rotation.

In another aspect, the torque coupling includes a centre member, left and right side members, and a plurality of crescent elements. The centre member rotates about a primary axis, and includes a plurality of equally spaced holes that are centered about an assembly centerline. The side members rotate together about a secondary axis, and each include a plurality of equally spaced cut outs that are centered about a secondary parallel offset centerline. The crescent elements are supported within the centre member by full complement roller bearings with attachment to the left and right side members by pins.

The crescent elements transfer torque from rotation about the primary axis to rotation about the secondary axis without changing the rotational speed or direction.

The crescent elements contain a primary axis and a secondary axis, each axis being separated by the same distance as the primary and secondary axis of the centre member and left and right side members respectively.

In one implementation, a coplanar gear set that consists of an input gear and an output gear is connected in such a manner that one of the gears rotates on the same axis as the left and right side members, while the other gear rotates on the same axis as the centre member. In another implementation, the left and right side members are rigidly coupled to one of the input or output gears. In yet another implementation, the centre member is rigidly coupled to one of the input or output gears.

BRIEF DESCRIPTION OF DRAWINGS

These and other aspects are better understood when the following detailed description is read with reference to the accompanying drawings, in which.

DETAILS

Figure 1:
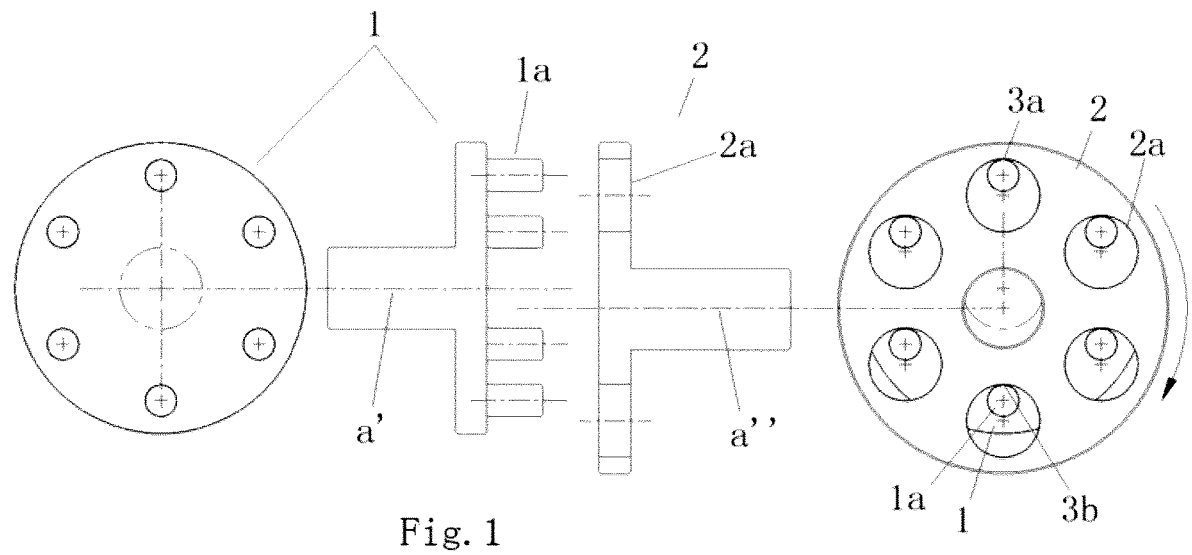
FIG. 1 is an isometric view of a prior art device that allows the transfer of torque between parallel offset axes in a 1:1 ratio.

Examples will now be described more fully hereinafter with reference to the accompanying drawings in which example embodiments are shown. Whenever possible, the same reference numerals are used throughout the drawings to refer to the same or like parts. However, aspects may embody many different forms and should not be construed as limited to the embodiments set forth herein.

FIG. 1 depicts a prior art mechanism that allows for the transfer of torque between parallel offset axes in a 1:1 ratio. The mechanism consists of a driven torque member 1 that rotates about a primary fixed axis a' and a driver torque member 2 that rotates about a secondary fixed axis a" that is parallel to and offset from the primary fixed axis a'. The spigots 1a are integral with the driven torque member 1 and protrude into the circular thru holes 2a of the driver torque member 2. Assuming a clockwise rotation, torque is transferred from the driver torque member 2 to the driven torque member 1 through sliding contact between the circular thru holes 2a and the spigots 1a. A disadvantage of this mechanism is that torque is transferred (theoretically) through sliding contact from the initial point of contact 3a to the end point of contact 3b.

Figure 2:
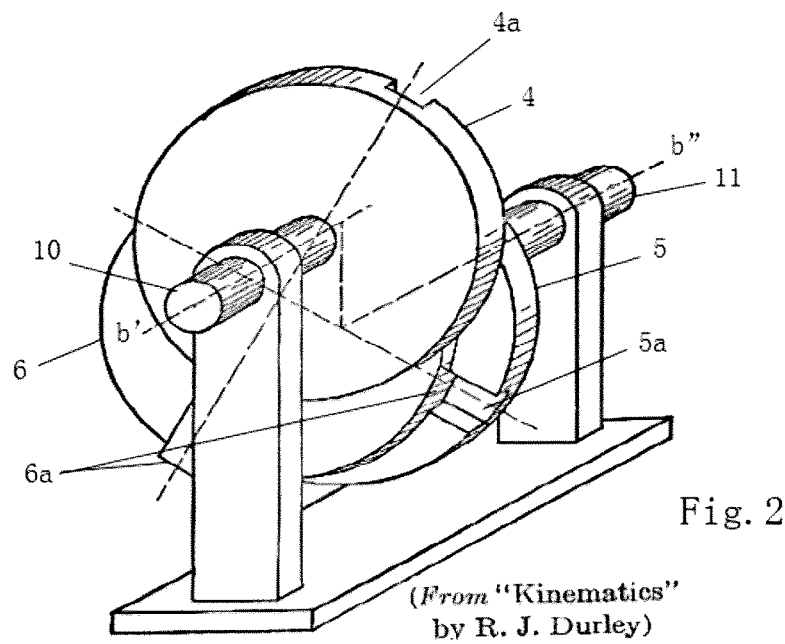
FIG. 2 is an isometric view of another prior art device that allows the transfer of torque between parallel offset axes in a 1:1 ratio.

Oldham's coupling, shown in FIG. 2, is another mechanism for transferring torque in a 1:1 ratio. Described in "Kinematics" by R. J. Durley, Oldham's coupling includes three elements: a first disc 4 coupled to an input torque member 10 that rotates about a primary fixed axis b', a second disc 5 coupled to an output torque member 11 that rotates about a secondary fixed axis b" that is parallel to and offset from the primary fixed axis b', and a third centre disc 6 that is joined to the first and second said discs by tongue 6a and groove 4a, 5a connections. The grooves (or slots) 4a, 5a in end members 4 and 5 are oriented such that they are perpendicular to one another. The tongues (or keys) 6a on each side the centre member 6 are placed within their respective grooves on the end members to form sliding pairs that allow the transfer of torque from said input torque member to said output torque member. This mechanism is particularly susceptible to abrasion between the keys and slots due to the sliding contact, which can lead to high frictional losses and decreased performance.

Figure 3:
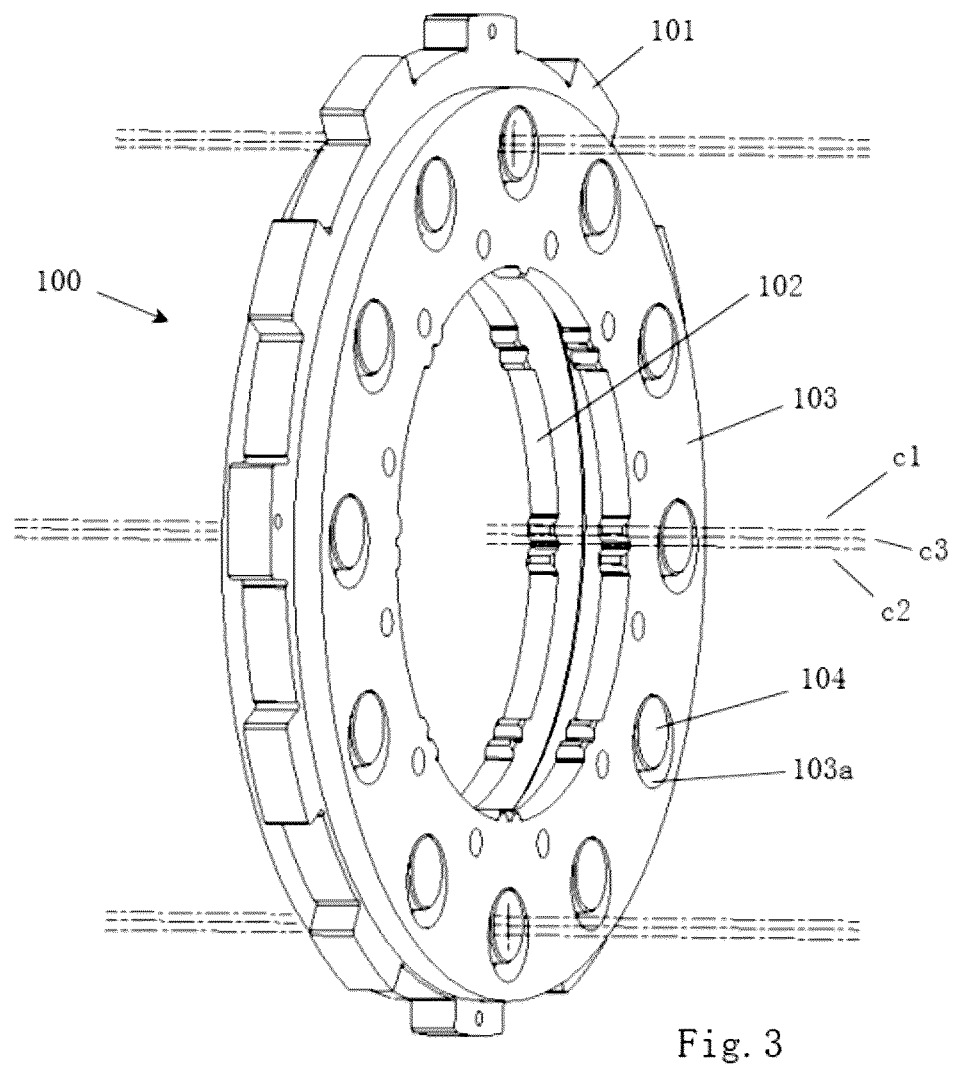
FIG. 3 shows an isometric view of a first embodiment of a one-to-one torque coupling with cylindrical roller elements.
Figure 4:
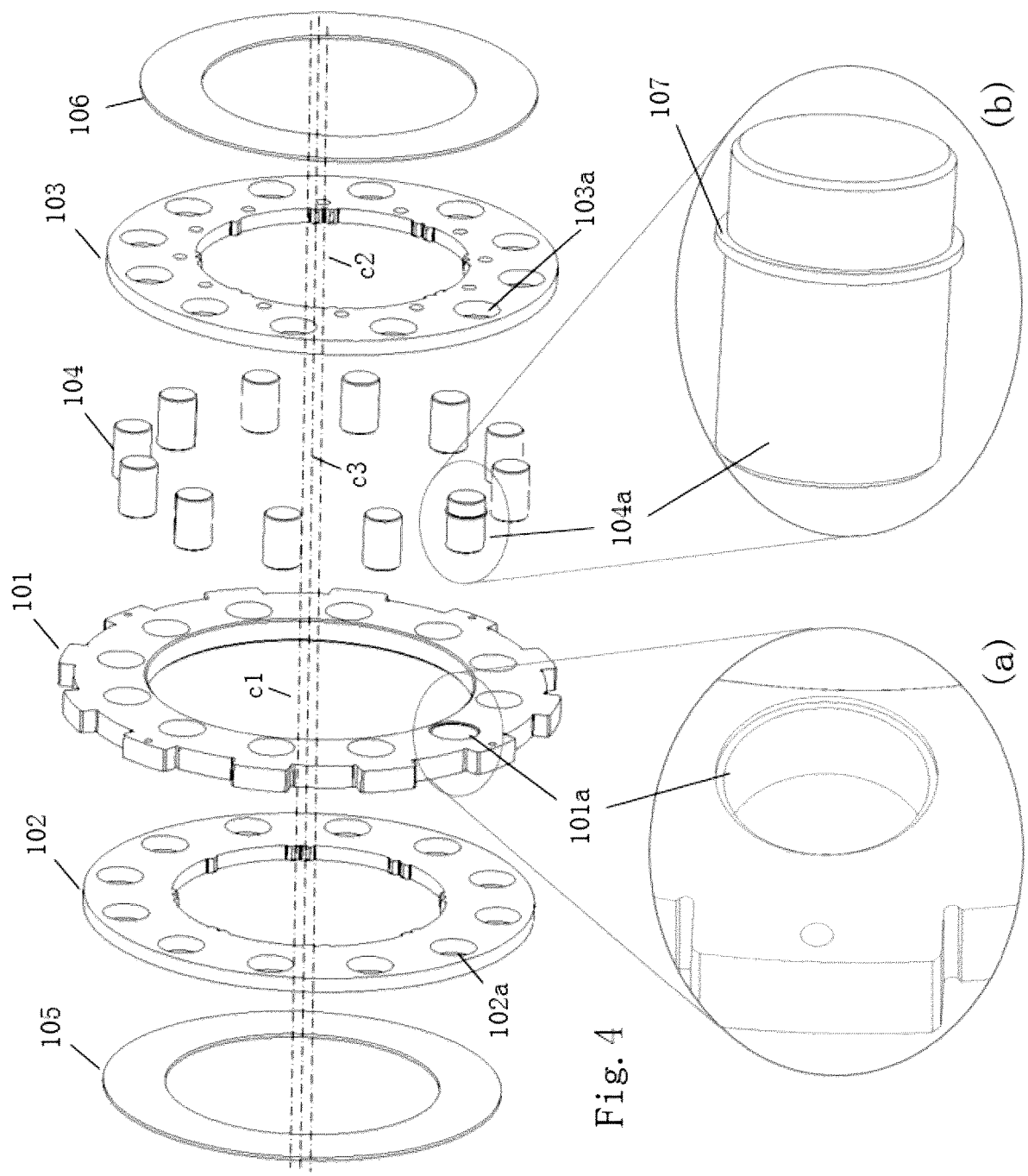
FIG. 4 shows an exploded view of the embodiment depicted in FIG. 3 with the addition different features that help to keep the cylindrical rollers in place.
Figure 5:
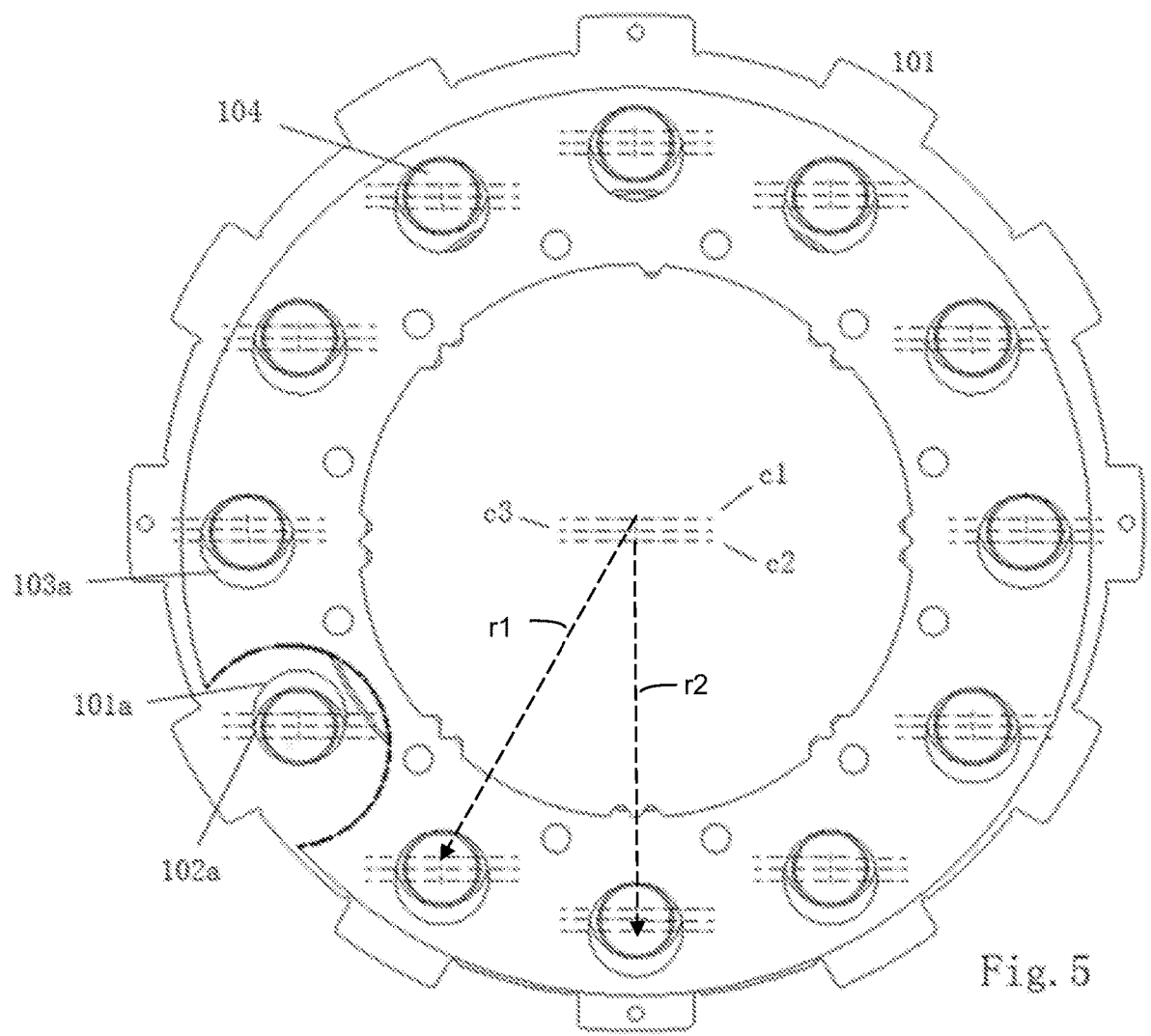
FIG. 5 shows an end view of the embodiment depicted in FIG. 3.

Referring now to FIGS. 3, 4 and 5, a one-to-one torque coupling 100 is shown comprising a centre member 101, a left side member 102, a right side member 103, and a plurality of torque transfer elements 104. The centre member 101 rotates about a main axis c1. The left side member 102 and the right side member 103 rotate about a secondary axis c2 that is parallel to and offset from the main axis c1. The torque transfer elements 104 rotate about a third axis c3 that is parallel to and offset from the main axis c1 and the secondary axis c2 and that is located midway between the main axis c1 and the secondary axis c2.

Preferably, the centre member 101 and side members 102, 103 all have an equal number of congruent circular thru-holes (101a, 102a, 103a). Further, preferably the thru-holes on each member 101, 102, 103 are evenly spaced at a respective radius about the member's rotational axis, and the radius (r1) at which the thru-holes 101a are disposed (about the main axis c1) on the centre member 101 is equal to the radius (r2) at which the thru-holes 102a, 103a are disposed (about the secondary axis c2) on the side members 102, 103. The number of the thru-holes 101a, 102a, 103a can vary depending on the physical size of the one-to-one torque coupling 100 and it is left up to the designer to determine the optimal number of holes. A greater number of thru-holes will distribute the torque more evenly within the members 101, 102, 103. However, the structural integrity of the centre member 101 and side members 102,103 can be compromised by having too many holes 101a, 102a, 103a.

Preferably, a first torque member (not shown), which rotates about the main axis c1, is attached to the centre member 101, and a second torque member (not shown), which rotates about the secondary axis c2, is attached to the left and right side members 102 and 103. In the embodiment shown, the centre member 101 is configured for attachment to the first torque member through a tabbed connection on its outer diameter. The left and right side members 102, 103 function together as a single unit and are configured for attachment to the second torque member through spline connections on the inner diameters of the side members 102, 103 such that the circular thru-holes 102a on the left side member 102 line up axially with the circular thru-holes 103a on the right side member 103. However, it is not necessary to use these specific types of external connections.

In the embodiment shown, the torque transfer elements 104 comprise cylindrical rollers 104. The cylindrical rollers 104 are disposed within the thru-holes of the centre member 101 and the side members 102, 103 such that the rollers 104 span the axial length from the thru-holes 102a of the left side member 102, through the thru-holes 101a in the centre member 101, to the thru-holes 103a of the right side member 103. Although the cylindrical rollers 104 are shown as all having the same diameter, the rollers 104 may be of different diameters provided that the corresponding thru-holes 101a, 102a, 103a in the centre and side members 101, 102, 103 are appropriately sized and the thru-holes 101a of the centre member 101 are congruent (size, placement) with the thru-holes 102a, 103a of the side members 102, 103. The rollers 104 may be sized such that their diameters are equal to the diameter of the circular holes 101a (or the diameter of the circular holes 102a, 103a) less the centre distance of rotation of the first torque member and the second torque member (i.e. less the distance that the secondary axis $c_2$ is offset from the main axis $c_1$). Or in other terms, the diameter of the thru-holes 101a, 102a, 103a may be sized by adding the diameter of the cylindrical rollers 104 to the centre distance of rotation of the centre and side members 101, 102, 103. An appropriate amount of clearance may then added to the thru-holes 101a, 102a, 103a to ensure that the cylindrical rollers 104 do not bind up.

FIG. 4 shows two methods of restricting the axial movement of the cylindrical rollers 104 within the thru-holes 101a, 102a, 103a. The first method involves the use of end caps 105, 106 which are respectively attached to the end surfaces of the left and right side members 102, 103. The second method involves the use of circlips 107 which are each fixed to a respective roller 104 (see FIG. 4b). In the latter case, preferably the thru-holes 101a in the centre member 101 are recessed (see FIG. 4a) to allow for the circlip 107 to fit in between the centre member 101 and the right side member 103. In certain assemblies, it is also possible for design elements adjacent to the left and right side members 102, 103 to act as the end caps 105 and 106.

Torque is transferred from the first torque member to the second torque member (or from the second torque member to the first torque member) without any change in speed or direction through smooth rolling contact between the cylindrical rollers 104 and the inner surfaces of the circular thru-holes in the centre member 101 and the side members 102, 103. This type of contact is ideal in terms of minimizing contact stress as the cylindrical rollers 104 and the inner surfaces of the circular thru-holes create a 'pin-in-trough' contact interface that maximizes the contact surface area.

Although, as discussed above, the diameter of the thru-holes may be sized by adding the diameter of the cylindrical rollers 104 to the centre distance of rotation of the centre and side members 101, 102, 103, in general the geometry (or diameter) of the thru-holes 101a, 102a, 103a in the centre and side members 101, 102, 103 is mutually independent of the centre distance of rotation of the centre member 101 and the side members 102, 103 and depends solely on the diameter of the cylindrical rollers 104. This is advantageous since the roller diameter can be made larger than the centre distance of rotation of the centre and side members 101, 102, 103, if desired, and there is potential to gain more capacity from the rollers 104 of the one-to-one coupling. FIG. 5 shows an end view of the one-to-one torque coupling 100 with the right end cap 106 removed. This clearly shows that the roller diameter is larger than the centre distance of rotation of the centre and side members 101, 102, 103.

The one-to-one torque coupling 100 works particularly well when used in conjunction with low ratio external/internal reverted coplanar gear train loops that incorporate addendum tooth form flanks, previously described by the instant inventor in U.S. Pat. No. 6,126,566, because the centre distance between such gear set pairs is typically small. Traditional involute tooth flanks can also be used in place of the addendum tooth form flanks however, there are limitations in terms of strength capacity and packaging. Therefore, the addendum tooth form flanks are preferred.

An assembly advantage is that the one-to-one torque coupling 100 can replace a secondary gear set that would be required to transfer torque from the output gear of the external/internal coplanar gear loop back to the main axis of the input torque member. Therefore, a single gear set can be used with the one-to-one torque coupling to provide a very slight increase or decrease in ratio within a tight package with the input and output being coaxial. In combination with concentric V-groove torque couplings, such as those described by the instant inventor in U.S. Pat. No. 8,764,597, the assembly described above can be stacked one beside the other providing a compact series of 'on-off' ratio state modules that can be supported by a single centering shaft. Controlling the bi-ratio state modules using an interactive clutch member in the concentric V-groove torque couplings is also described by the instant inventor in U.S. Pat. No. 6,669,594.

Figure 6:
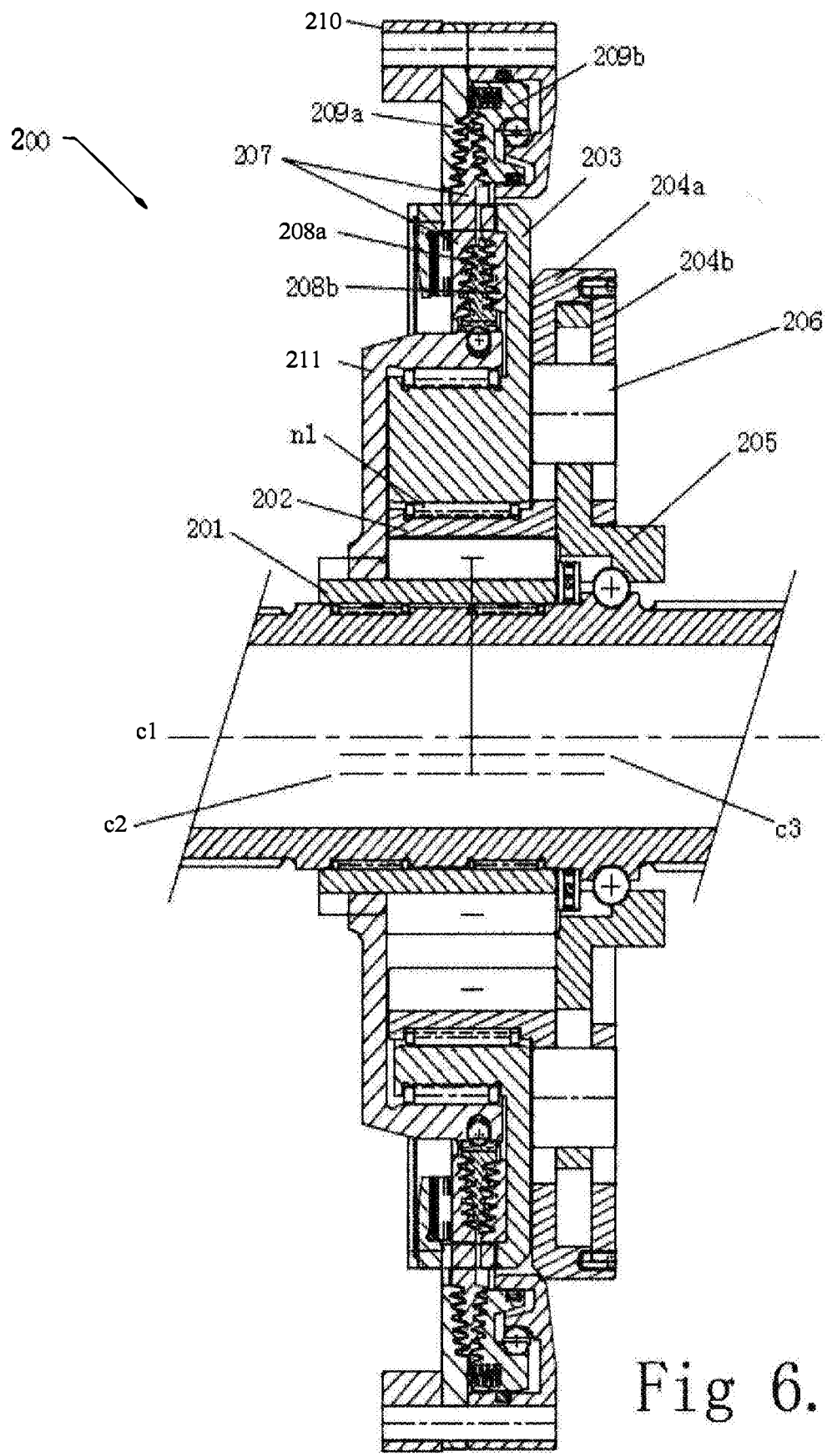
FIG. 6 illustrates a longitudinal cross-sectional view of a first embodiment of a bi-ratio state module incorporating a one-to-one torque coupling.
Figure 6A:
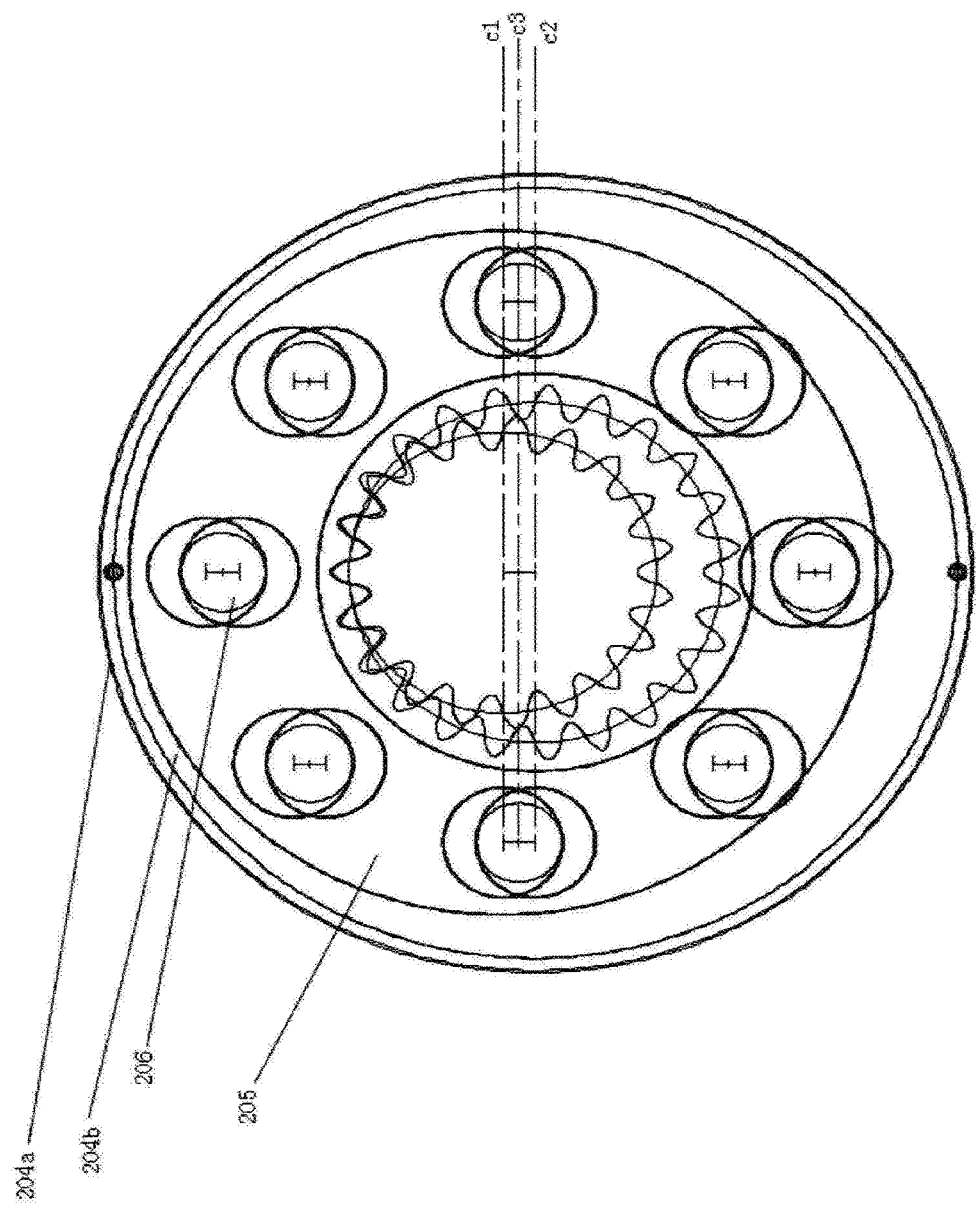
FIG. 6a illustrates a transverse cross-sectional view of the bi-ratio state module depicted in FIG. 6.

FIG. 6, illustrates in cross-section, a bi-ratio state module, denoted generally as 200, incorporating an external/internal coplanar gear set with addendum tooth form flanks and a one-to-one torque coupling (comprising centre member 205, side members 204a, 204b, and cylindrical rollers 206) in which a pair of concentric V-groove torque couplings, consisting of inner V-groove coupling (comprising centre clutch member 208a disposed between interactive member 207 and clutch end member 208b) and outer V-groove coupling (comprising interactive member 207 disposed between clutch end members 209a, 209b), control the output state of the module. The one-to-one torque coupling ensures that the output is passed along the main axis $c_1$. This configuration of the one-to-one coupling is slightly different from the one-to-one coupling 100 depicted in FIGS. 3, 4 and 5 since the centre member 205 is buried within the side members 204a and 204b and the connection to a potential external torque member does not line up axially with the centre member 205. Torque can be transferred in either direction through the bi-ratio state module, meaning that pinion 201 or centre member 205 can act as either the input or output member.

For the purpose of explaining the module's function, pinion 201 is taken as the input member and centre member 205 is taken as the output member. Pinion 201, which rotates about the main axis $c_1$, and annular gear 202, which rotates about a parallel offset axis $c_2$, together with eccentric member 203, form an external/internal coplanar gear set that acts as the input to the bi-ratio state module. Intermediate member 211 couples interactive member 207 of the inner and outer concentric V-groove torque couplings to the input pinion 201. Interactive member 207 is axially moveable on eccentric member 203, which is supported by a needle roller bearing n1 that is centred about the offset axis $c_2$.

When the outer concentric V-groove torque coupling is activated hydraulically or pneumatically, the inner concentric V-groove torque coupling is forced into an open state and the eccentric member 203 is grounded to the housing 210, causing a fixed gear ratio to be passed to the one-to-one torque coupling. When the outer concentric V-groove torque coupling is deactivated, a wave spring activates the inner concentric V-groove torque coupling and eccentric member 203 is directly coupled to the input pinion 201, causing a 1:1 ratio to be passed to the one-to-one torque coupling. The one-to-one torque coupling then transmits either of the ratio states (fixed or 1:1) from the side plates 204a and 204b, which rotate about axis c2, to the centre member 205 via smooth rolling contact of the cylindrical rollers 206.

Figure 7:
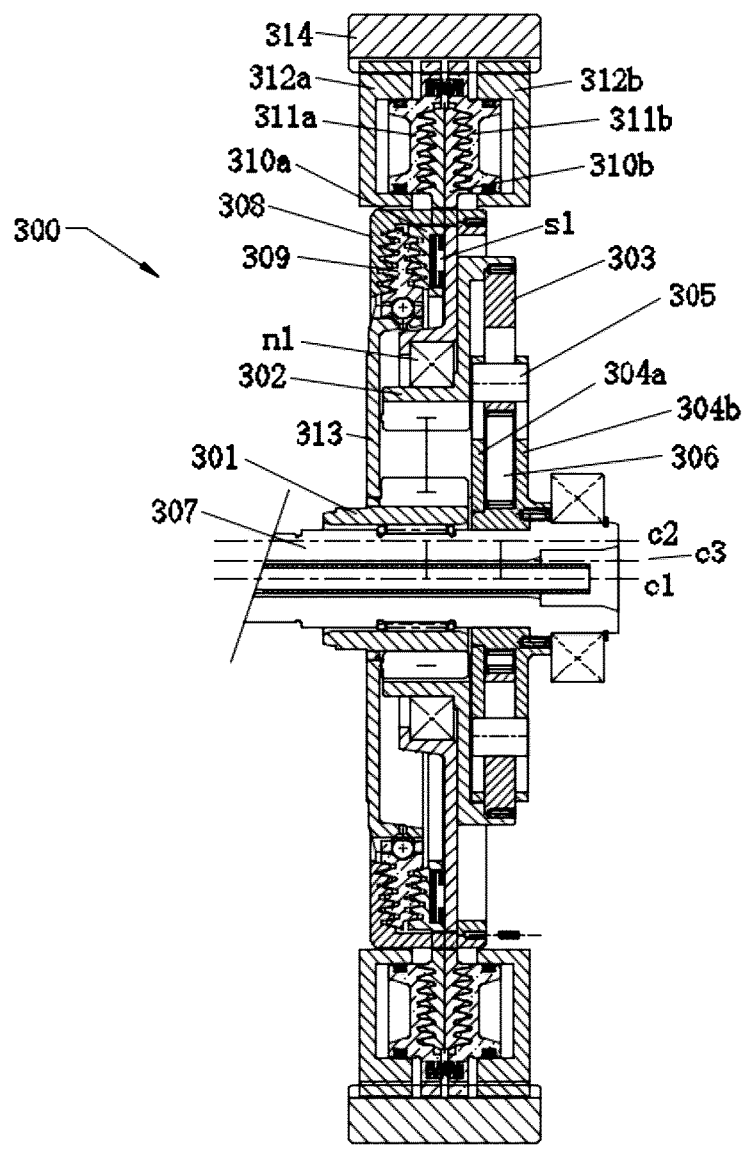
FIG. 7 illustrates a cross-sectional view of a second embodiment of a bi-ratio state module incorporating a one-to-one torque coupling.

FIG. 7, illustrates in cross-section, a second configuration of a bi-ratio state module, denoted generally as 300, incorporating an external/internal coplanar gear set with addendum tooth form flanks and a one-to-one torque coupling (comprising centre member 303, side members 304a, 304b, and cylindrical rollers 305) in which a pair of concentric V-groove torque couplings, consisting of inner V-groove coupling (comprising centre clutch member 309 disposed between interactive member 310a and clutch end member 308) and outer V-groove coupling (comprising interactive members 310a and 310b disposed between end pistons 311a, 311b), control the output state of the module. Again, the one-to-one torque coupling ensures that the output is passed along the main axis c1.

Pinion 301 or shaft 307 (which is attached to side members 304a and 304b) can act as either the input or output member for the bi-ratio state module. However, for the purpose of explaining this module's function, pinion 301 is taken as the input member and shaft 307 is taken as the output member. Pinion 301, which rotates about the main axis c1, and annular gear 302, which is supported by bearing n1 and rotates about an offset axis c2, form a coplanar gear set that acts as the input to the bi-ratio state module. Intermediate member 313 couples the input pinion 301 to the centre member 309 of the inner concentric V-groove torque coupling. Interactive member 310a is axially moveable on the housing 308 of the inner concentric V-groove torque coupling and rotates about the main axis c1.

When the end pistons 311a and 311b of the outer concentric V-groove torque coupling are activated hydraulically or pneumatically, end piston 311b acts as a rigid support for bearing n1 causing annular gear 302 to rotate about a fixed axis c2. Therefore, a fixed ratio is passed from the coplanar gear set to the centre member 303 of the one-to-one coupling. A floating eccentric bearing support 306 helps to stabilize the centre member 303 as it rotates about the fixed offset axis c2. When the end pistons 311a, 311b are deactivated, a wave spring s1 activates the inner concentric V-groove torque coupling causing the input pinion 301 to be directly coupled to the housing 308, forcing annular gear 302 to rotate eccentrically about the main axis c1 in a 1:1 ratio state with the input pinion. Therefore, a 1:1 ratio is passed from the annular gear 302 to the centre member 303 of the one-to-one torque coupling. Torque is then transferred from the centre member 303 to the side members 304a and 304b via the cylindrical rollers 305 to the output shaft 307, which rotates about the main axis c1.

Figure 8:
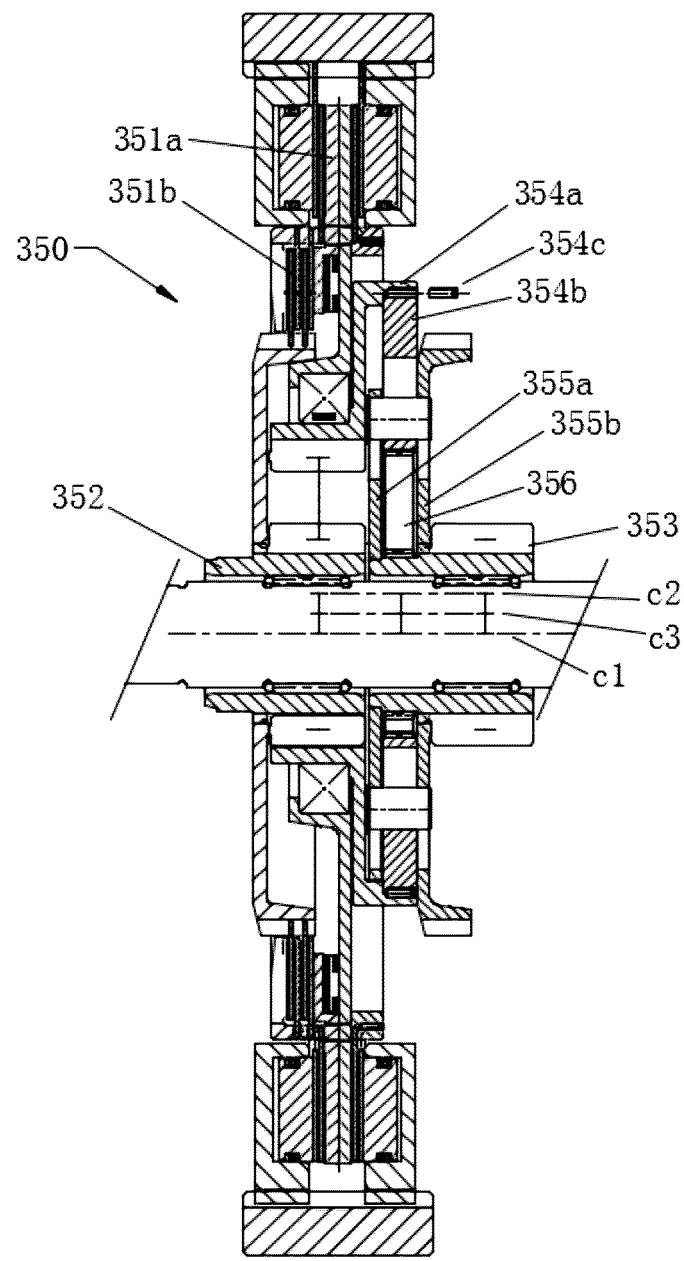
FIG. 8 illustrates a cross-sectional view of a third embodiment of a bi-ratio state module that is kinematically identical to the second bi-ratio state module depicted in FIG. 7 with wet friction clutches replacing the concentric V-groove torque couplings.

FIG. 8, illustrates in cross-section, an identical configuration of the one-to-one torque coupling depicted in FIG. 7, denoted generally as 350, with the exception that wet friction clutches 351a and 351b are used in place of the concentric V-groove torque couplings. The wet friction clutches have much less capacity than the concentric V-groove couplings, but are of significantly lower cost. Therefore, it is left up to the designer to choose which type of coupling to use in each particular application of the art. In FIG. 7, the input pinion and output shaft (301 and 307, respectively) rotate concentrically on the same side of the embodiment, whereas in FIG. 8, the input pinion and output pinion (352 and 353, respectively) rotate on opposite sides of the embodied module. Each embodiment can be used in combination with either wet friction clutch discs or concentric V-groove couplings.

Figure 9:
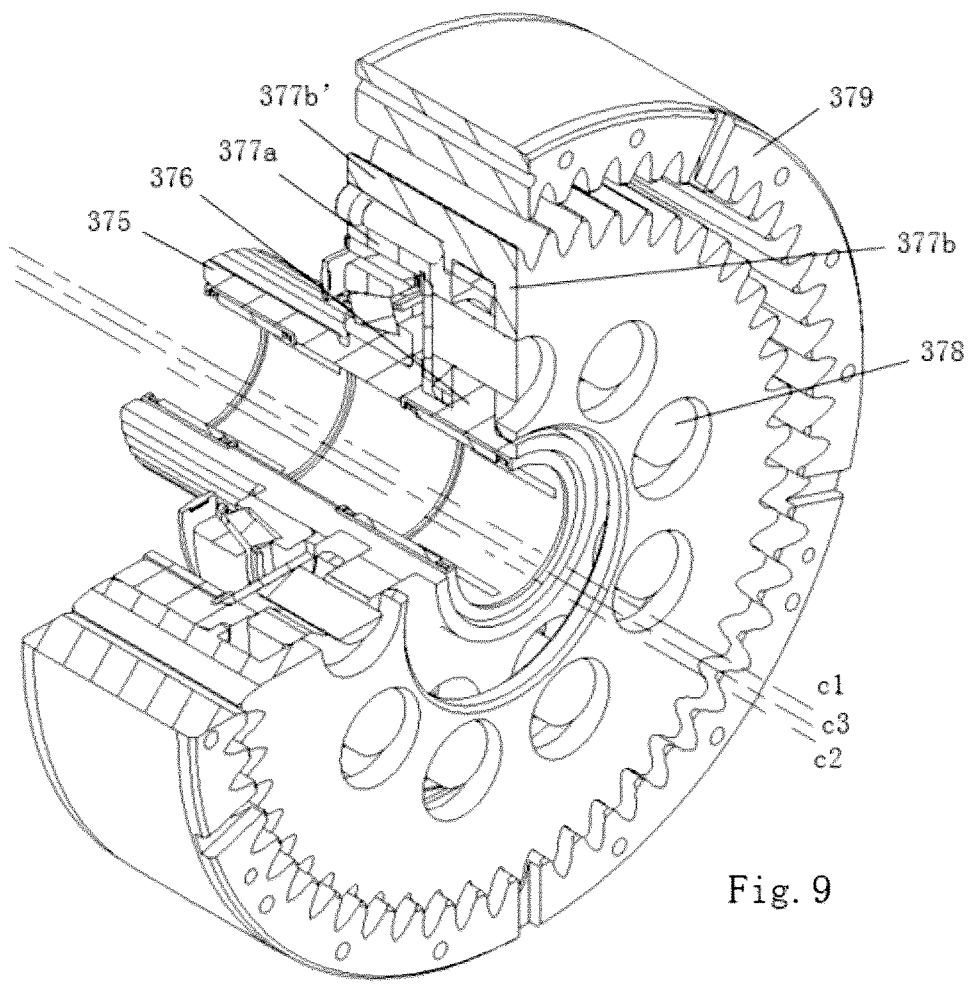
FIG. 9 illustrates a one-to-one coupling that is integral with a coplanar gear set.

FIG. 9 shows a configuration of the one-to-one torque coupling in which the centre member 376 is integral with shaft 375 and the right side member 377b is integral with pinion 377b' of the coplanar gear set (377b' and 379). The left side member 377a is coupled to the right side member 377b via a spline connection. The shaft/centre member (375/376) and annular gear 379 rotate about the main axis c1 and the right and left side members/pinion (377a, 377b/377b') rotate about a parallel offset axis c2. This arrangement creates a high density power transfer mechanism where torque can be transferred (in either direction) between the shaft 375 and the annular gear 379 via the one-to-one connection.

Figure 10:
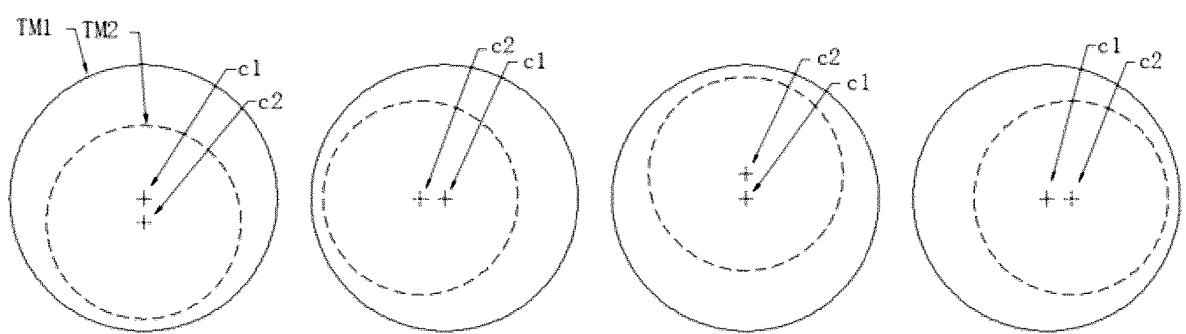
FIG. 10 illustrates a sketch showing the eccentric rotation of a second torque member about a first torque member.

The one-to-one torque coupling 100 also functions if one of the torque members rotates eccentrically about the centre of the other torque member. FIG. 10 shows a coupling 100 in which the first torque member TM1 has a fixed main axis of rotation c1, and the second torque member TM2 has an axis of rotation c2 that orbits eccentrically about the main axis of rotation c1.

Figure 11:
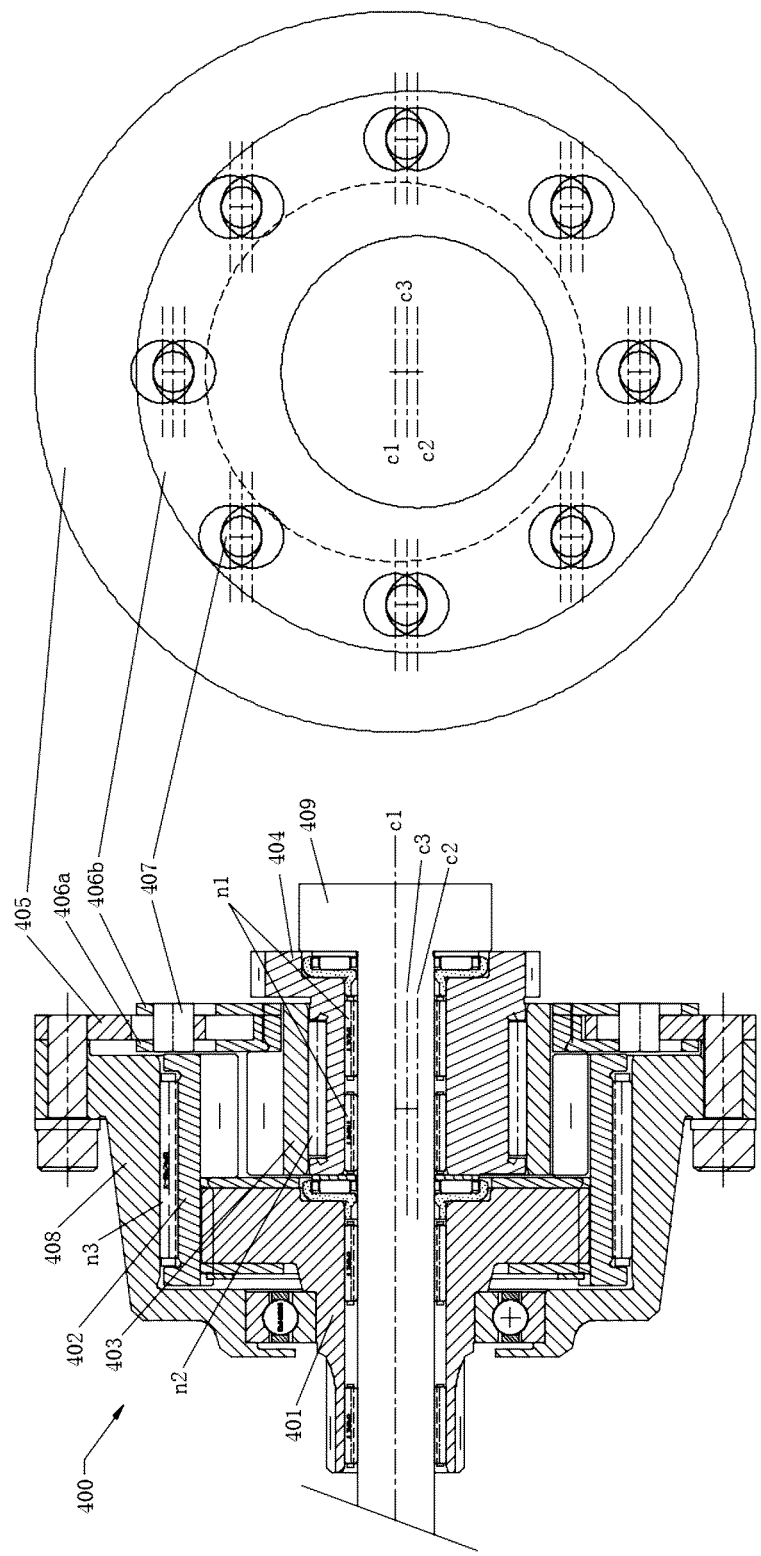
FIG. 11 illustrates a cross-sectional view of a high-ratio module in which the centre member of the one-to-one torque coupling is grounded.

FIG. 11, illustrates in cross-section, a high-ratio module, denoted generally as 400, comprising an external/internal coplanar gear set with addendum tooth form flanks and a one-to-one torque coupling (405, 406a, 406b, 407). Either member 401 or eccentric member 404 can be the input or output elements for the high-ratio module however, for the purpose of explaining its functionality, member 401 is considered to be the input member and eccentric member 404 is considered to be the output member. The concept of the high-ratio module is based on a conventional cluster coplanar reverted gear train loop, previously described by the instant inventor in U.S. Pat. No. 6,126,566, which typically consists of a pinion, a cluster, an annular gear, and a cage (or eccentric member).

Figure 12:
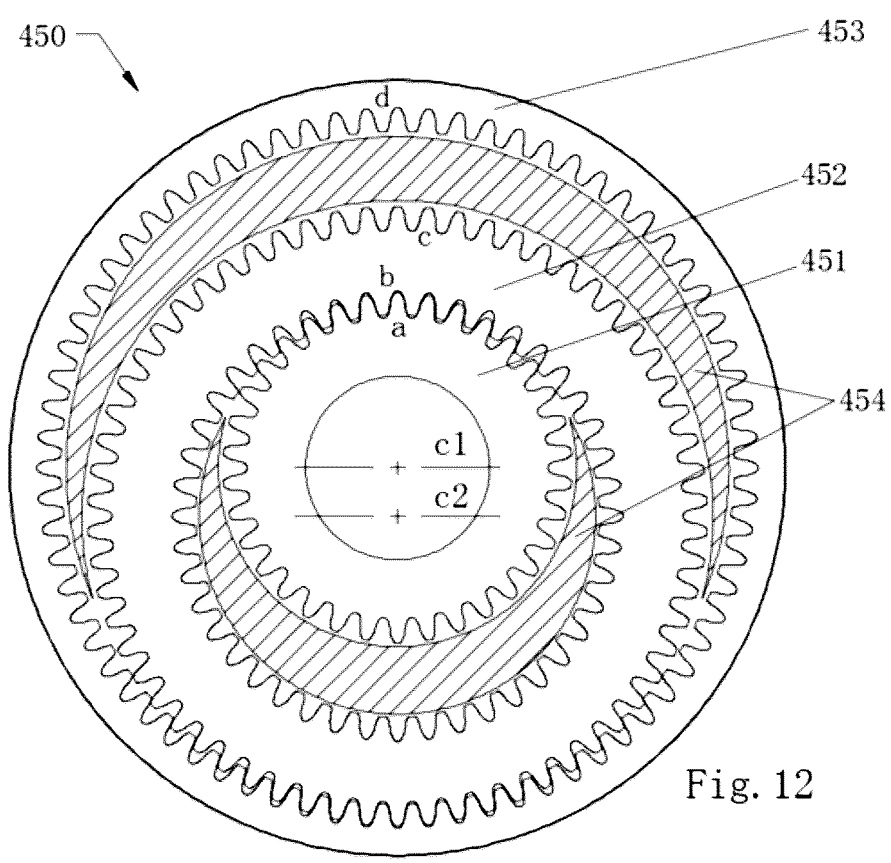
FIG. 12 illustrates a conventional coplanar reverted gear train loop.

In a conventional cluster coplanar reverted gear-train loop, denoted generally as 450 in FIG. 12, the relationships describing the angular velocities of its components are $$\omega_P = \frac{k-1}{k}\omega_C - \frac{1}{k}\omega_A$$

$$\omega_{CL} = \frac{c-d}{c}\omega_C - \frac{d}{c}\omega_A$$

$$k = \left(\frac{a}{b}\right)\left(\frac{c}{d}\right)$$

where $\omega_P$, $\omega_C$, $\omega_A$, and $\omega_{CL}$ represent the angular velocities of the pinion 451, the cage (or eccentric) 454, the annular gear 453, and the cluster 452 respectively and a, b, c, and d are the number of teeth on the pinion, inner cluster, outer cluster, and annular gear respectively. In the high-ratio module 400, the centre member 405 of the one-to-one coupling acts as the pinion 451 of the coplanar reverted loop and the side members 406a and 406b act as the 'b' mesh of the cluster 452. With the centre member 405 fixed to housing 408, the relationship between the annular gear 402 and the eccentric member 404 becomes $$\omega_{eccentric\,(404)} = \frac{1}{1-k}\omega_{annular\,gear\,(402)}$$

-continued $$k = \left(\frac{a}{b}\right)\left(\frac{c}{d}\right)$$

The one-to-one coupling implies that $$\frac{a}{b} = 1.$$

A mechanical advantage is that a very high ratio can be created between the eccentric member 404 and member 401 by choosing an appropriate number of teeth on the annular gear 402 and the pinion 403. For example, if the number of teeth on the annular gear 402 and the pinion 403 are chosen to be 60 and 56, respectively, a 15:1 gear reduction results from the input member 401 to the eccentric output member 404. Since the centre member 405 of the one-to-one coupling is fixed, input from the annular gear 402 causes the pinion 403, along with the side members 406a and 406b, to 'walk' around its gear mesh forcing the eccentric member 404 to rotate about the main axis c1 through bearing race n2.

Figure 13:
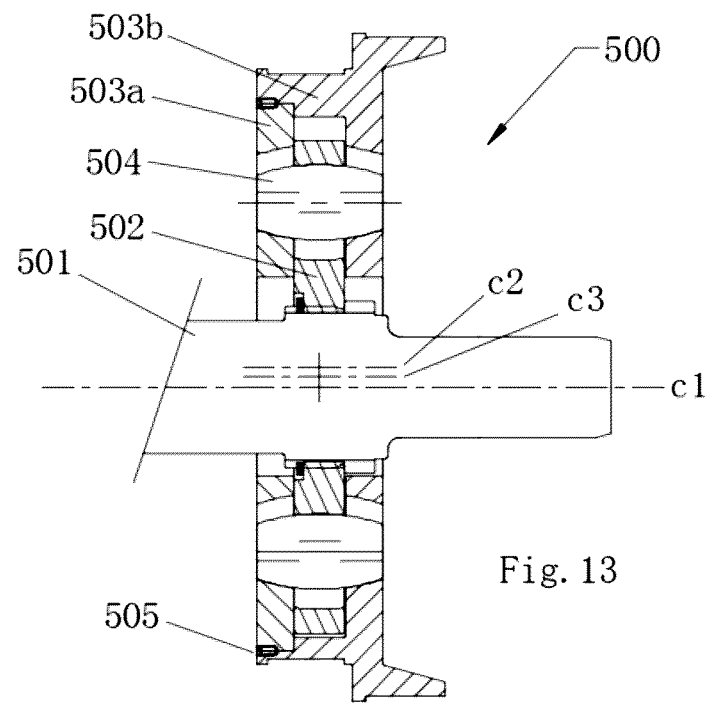
FIG. 13 illustrates a cross-sectional view of a second embodiment of the one-to-one torque coupling incorporating elliptical rollers.
Figure 14:
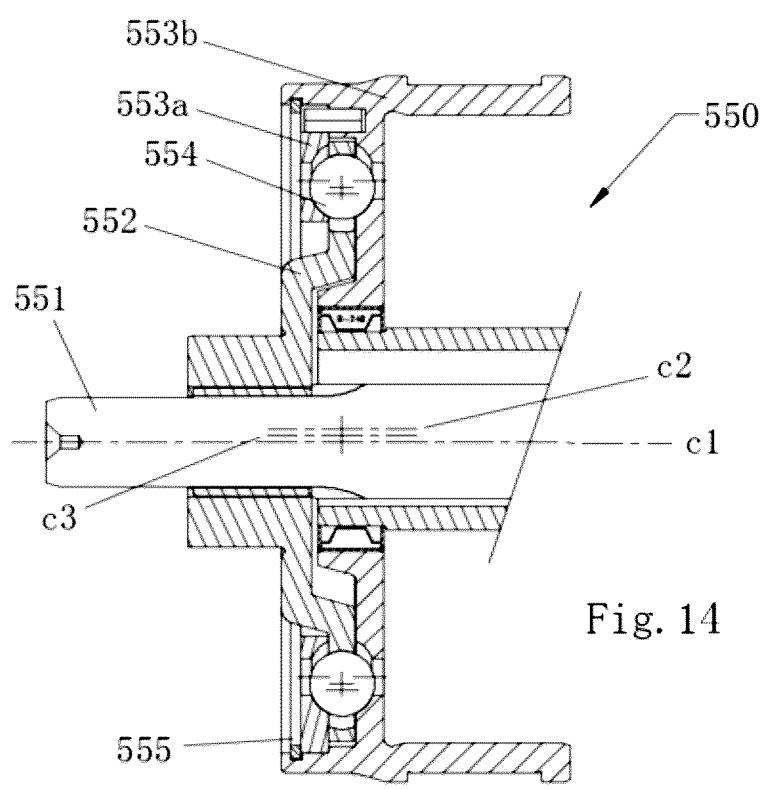
FIG. 14 illustrates a cross-sectional view of a third embodiment of the one-to-one torque coupling incorporating spherical rollers.

FIGS. 13 and 14, illustrate in cross-section, separate embodiments of the one-to-one coupling using elliptical and spherical roller elements, 504 and 554 respectively, in place of the preferred cylindrical rollers. The elliptical and spherical roller elements, 504 and 554, do not require end caps to hold them in place (in a geometric sense), however, as torque is transferred from the centre member to the side members and vice versa, axial forces develop within holes of the one-to-one coupling that tend to separate the side members from the one-to-one coupling. To keep the side members from separating, they are keyed together and held in place by a plurality of set screws (FIG. 13) and a circlip (FIG. 14). It is left to the designer to select the form of rolling element that is best suited for their design.

Figure 15:
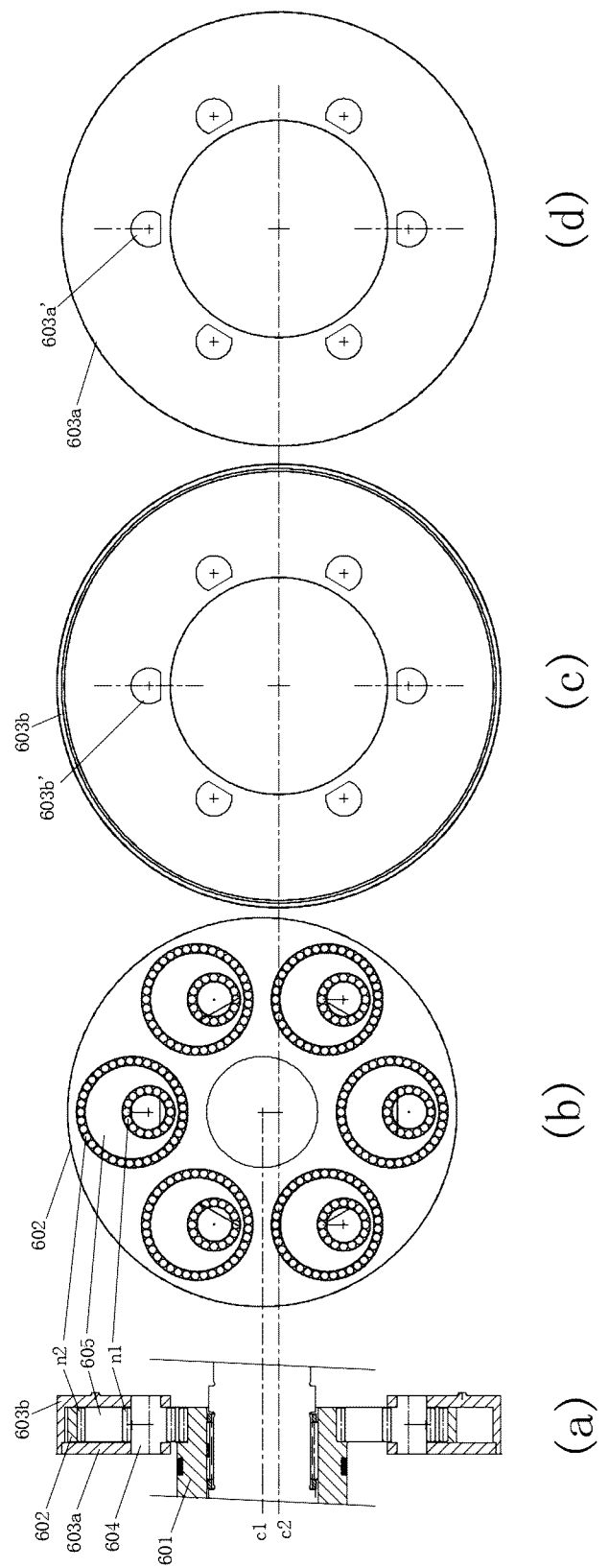
FIG. 15 illustrates a cross-sectional view of a fourth embodiment of the one-to-one torque coupling incorporating multi-crescent elements.

FIG. 15a, illustrates in cross-section, a one-to-one torque coupling 600 that incorporates multi-crescent elements 605 in place of the aforementioned roller elements. FIG. 15b shows the centre member 602 with the multi-crescent elements 605 located by full complement bearings n1 and n2. FIGS. 15c and 15d show the right and left side members 603a and 603b, respectively, with appropriately shaped cut-outs to accept pins 604 which are used to hold said side members in place. In this particular arrangement, the centre member 602 rotates about a main axis c1 and the side members 603a and 603b rotate about an parallel offset axis c2. Torque is transferred through the full complement bearings n1 and n2 as the eccentric multi-crescent elements rotate within the circular holes of the centre member 602.

It will be apparent to those skilled in the art that various modifications and variations can be made without departing from the scope of the invention as defined by the appended claims.

The invention claimed is:

1. A coupling comprising:
   a centre member having a main axis of rotation and including a plurality of holes disposed about the main axis at a radius;
   left and right side members each having a common offset axis of rotation parallel to and offset from the main axis, each said side member including a plurality of holes congruent with the holes in the centre member and disposed about the offset axis at the radius; and
   a plurality of torque transfer elements extending through the holes of the centre member into the holes of the side members;
   wherein the centre member is disposed between the side members, and the torque transfer elements comprise cylindrical rollers and rotate about a third axis parallel to and disposed midway between the main axis and the offset axis and transfer torque between the centre member and the side members through rolling contact between the torque transfer elements and the holes of the centre and side members, and
   wherein each said cylindrical roller has a diameter that is greater than a distance between the main axis and the offset axis.

2. The coupling according to claim 1, further including end caps coupled to the side members for retaining the torque transfer elements within the holes.

3. The coupling according to claim 1, wherein one of the torque transfer elements includes a circlip for retaining said one torque transfer element within the respective holes.

* * * * *